United States Patent
Fujiwara et al.

(10) Patent No.: US 9,776,273 B2
(45) Date of Patent: Oct. 3, 2017

(54) ARC-WELDING METHOD AND ARC-WELDING APPARATUS

(71) Applicant: Panasonic Intellectual Property Management Co., Ltd., Osaka (JP)

(72) Inventors: Junji Fujiwara, Osaka (JP); Yasushi Mukai, Osaka (JP); Atsuhiro Kawamoto, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 316 days.

(21) Appl. No.: 14/522,909

(22) Filed: Oct. 24, 2014

(65) Prior Publication Data

US 2015/0041449 A1    Feb. 12, 2015

Related U.S. Application Data

(63) Continuation of application No. PCT/JP2013/001550, filed on Mar. 11, 2013.

(30) Foreign Application Priority Data

Jun. 18, 2012 (JP) .................................. 2012-136604

(51) Int. Cl.
*B23K 9/095* (2006.01)
*B23K 9/073* (2006.01)
(Continued)

(52) U.S. Cl.
CPC .............. *B23K 9/095* (2013.01); *B23K 9/073* (2013.01); *B23K 9/0732* (2013.01); *B23K 9/09* (2013.01); *B23K 9/124* (2013.01)

(58) Field of Classification Search
USPC ...................................... 219/130.21, 137 PS
See application file for complete search history.

(56) References Cited

U.S. PATENT DOCUMENTS 4,665,299 A * 5/1987 Iwata ................... B23K 9/0732
219/130.21
5,281,791 A * 1/1994 Tabata ................. B23K 9/0732
219/130.33
(Continued)

FOREIGN PATENT DOCUMENTS

CN    1921978    2/2007
EP    1 232 825    8/2002
(Continued)

OTHER PUBLICATIONS

International Search Report of PCT application No. PCT/JP2013/001550 dated Jun. 4, 2013.
(Continued)

*Primary Examiner* — David Angwin
*Assistant Examiner* — John J Norton
(74) *Attorney, Agent, or Firm* — Wenderoth, Lind & Ponack, L.L.P.

(57) ABSTRACT

An arc-welding method in welding by repeating a short circuit and an arc. When the sign of opening of the short circuit is detected, the welding current is reduced from a first current value at the detection of the sign to a second current value, which is lower than the first current value. When the opening of the short circuit is detected, a pulse current having a peak value higher than the first current value is supplied at a plurality of times in the arc period. This suppresses porosities and spatters when galvanized steel sheets are welded.

8 Claims, 10 Drawing Sheets

(51) Int. Cl.
*B23K 9/12* (2006.01)
*B23K 9/09* (2006.01)

(56) References Cited

U.S. PATENT DOCUMENTS

| | | | |
|---|---|---|---|
| 5,317,116 A | 5/1994 | Tabata et al. | |
| 5,416,299 A | 5/1995 | Tabata et al. | |
| 5,473,139 A | 12/1995 | Matsui et al. | |
| 5,525,778 A | 6/1996 | Matsui et al. | |
| 5,667,709 A * | 9/1997 | Ueyama | B23K 9/091 219/130.51 |
| 6,207,928 B1 * | 3/2001 | Kawamoto | B23K 9/092 219/130.51 |
| 8,124,913 B2 | 2/2012 | Artelsmair | |
| 8,373,093 B2 * | 2/2013 | Peters | B23K 9/091 219/130.21 |
| 8,723,081 B2 * | 5/2014 | Hongu | B23K 9/0731 219/130.33 |
| 2007/0056944 A1 * | 3/2007 | Artelsmair | B23K 9/092 219/130.5 |
| 2009/0127242 A1 | 5/2009 | Aimi et al. | |
| 2009/0152252 A1 | 6/2009 | Kawamoto et al. | |
| 2010/0224608 A1 | 9/2010 | Aimi et al. | |
| 2011/0287764 A1 | 11/2011 | Zitnik | |
| 2012/0097654 A1 | 4/2012 | Kawamoto et al. | |
| 2012/0255940 A1 | 10/2012 | Fujiwara et al. | |

FOREIGN PATENT DOCUMENTS

| | | | | |
|---|---|---|---|---|
| JP | 60223661 A | * | 11/1985 | ........... B23K 9/0731 |
| JP | 60223662 A | * | 11/1985 | ........... B23K 9/0731 |
| JP | 01299769 A | * | 12/1989 | |
| JP | 03-008579 | | 1/1991 | |
| JP | 06-285643 | | 10/1994 | |
| JP | 08-309533 | | 11/1996 | |
| JP | 2004-237356 | | 8/2004 | |
| JP | 2006-088180 | | 4/2006 | |
| JP | 2006-334601 | | 12/2006 | |
| JP | 2012-040594 | | 3/2012 | |
| JP | 2012-081501 | | 4/2012 | |
| WO | 91/01842 | | 2/1991 | |
| WO | 2006/092896 | | 9/2006 | |
| WO | 2011/004586 | | 1/2011 | |
| WO | 2011/146844 | | 11/2011 | |
| WO | 2012/046411 | | 4/2012 | |

OTHER PUBLICATIONS

English Translation of Chinese Search Report dated Aug. 7, 2015 for the related Chinese Patent Application No. 201380032007.5.
Extended European Search Report dated Jan. 4, 2016 in European Application No. 13806261.7.

* cited by examiner

ARC-WELDING METHOD AND ARC-WELDING APPARATUS

BACKGROUND

1. Technical Field

The present invention relates to an arc-welding method and an arc-welding apparatus for welding by alternately making a short-circuit state and an arc state while repeating a forward feed and a reverse feed for feeding a welding wire as a consumable electrode.

2. Background Art

Generally, widely used methods for welding galvanized steel sheets are short-circuit transfer welding (e.g. $CO_2$ welding and MAG welding), and pulse MAG welding. FIG. 8, FIG. 11A, and FIG. 11B are diagrams used to explain conventional arc-welding methods for welding galvanized steel sheets, for example. FIG. 8 shows a section of a bead when galvanized steel sheets are welded by a consumable electrode type arc-welding method, which is a typical welding method.

The boiling point of zinc in galvanization 27 on the surfaces of objects to be welded 25 is 907° C., which is lower than the melting point of iron, 1536° C. When arc welding is performed on a galvanized steel sheet, zinc vaporizes, and this zinc vapor attempts to pass through a molten pool and diffuse to the outside. However, when the solidification speed of the molten metal of objects to be welded 25 is high, the zinc vapor cannot be released to the outside of the molten pool sufficiently and remains, as porosity 28, inside or on the surface of welding bead 26. Porosity 28 remaining in welding bead 26 forms a blow hole. Porosity 28 remaining opened to the surface of welding bead 26 forms a pit. Both of a blow hole and a pit affect the strength of welding. For this reason, in the automobile industry, where a large number of galvanized steel sheets are used, blow holes and pits need to be suppressed, and especially the amount of pits is predetermined and controlled in many cases.

As a conventional method for arc-welding galvanized steel sheets, FIG. 11A and FIG. 11B show waveforms of a welding current and a wire-feeding speed when pulse welding is performed with Ar, or a mixture gas containing Ar and carbon dioxide gas in an amount of 25% or less added thereto. FIG. 11A shows a waveform of the welding current; FIG. 11B shows a waveform of the wire-feeding speed.

As shown in FIG. 11A, the waveform of the welding current includes first period TL and second period TH. The sum of first period TL and second period TH is waviness period TW. Waviness period TW is a period in which a number of cycles are repeated in one second. In a known arc-welding method (see Japanese Patent Unexamined Publication No. 1106-285643, for example), the current waveform pattern or the wire-feeding speed is changed at frequencies of 10 to 50 Hz in waviness period TW.

First period TL is a period of a current waveform in which first average arc force FL acts on the molten pool. Second period TH is a period of a current waveform in which second average arc force FH, which is larger than first average arc force FL, acts on the molten pool.

The arc force acts as the force that pushes down the molten pool. Thus, changing first average arc force FL and second average arc force FH makes the molten pool in a waving state. In this waving state, any porosity 28 generated from the galvanized layer in the molten pool reaches the surface of the molten pool because of the flow of the molten pool and the buoyancy of porosity 28, and is released to the outside of the molten pool.

SUMMARY

In a conventional arc-welding method described in Japanese Patent Unexamined Publication No. 1106-285643 with reference to FIG. 11A and FIG. 11B, the reduction of blow holes in objects to be welded each having a thickness of 1.6 mm and a zinc coating weight of 45 g/m² is considered as an exemplary embodiment. However, the major objective of this method is to vibrate the molten pool. With this method, the molten pool cannot be moved to a degree so as to expose root part 32, i.e. a welding line formed when objects to be welded 25 are overlapped as shown in FIG. 8.

Thus, the following problem arises. When the thickness of the object is 2.0 mm or greater, the necessary amount of penetration is increased. This increases the thickness of the molten pool, and hinders release of zinc vapor. When a galvanized steel sheet having a zinc coating weight greater than 45 g/m² is welded, the amount of generation of zinc vapor increases. Such zinc vapor is not released and remains in welding bead 26. This increases the amount of generation of porosities 28 (blow holes and pits).

The zinc vapor floats in the molten pool and is released from the surface of the molten pool. Thus, the molten metal gushed out at the release of zinc vapor is scattered as spatters, or short-circuits with the welding wire and is scattered by the electric energy as spatters. Thus, an abnormally large amount of spatters are generated.

The arc-welding method of the present invention is an arc-welding method in welding by repeating a short circuit and an arc. When the sign of opening of the short circuit is detected, the welding current is reduced from a first current value at the detection of the sign to a second current value, which is lower than the first current value. When the opening of the short circuit is detected, a pulse current having a peak value higher than the first current value is supplied at a plurality of times in the arc period.

Further, in the arc-welding method of the present invention, the lower limit of the pulse current supplied at the plurality of times in the arc period is lower than the first current value.

Further, in the arc-welding method of the present invention, the lower limit of the pulse current supplied at the plurality of times in the arc period is lower than the second current value.

An arc-welding method of the present invention is an arc-welding method in welding by repeating a short circuit and an arc. When opening of the short circuit is detected, a pulse current having a peak value higher than the current value at the opening of the short circuit is supplied at a plurality of times in the arc period.

Further, in the arc-welding method of the present invention, the lower limit of the pulse current supplied at the plurality of times in the arc period is lower than the current value at the opening of the short circuit.

Further, in the arc-welding method of the present invention, a wire is fed at a wire-feeding speed of repeating a forward feed and a reverse feed.

Further, in the arc-welding method of the present invention, the forward feed and the reverse feed at the wire-feeding speed are periodically repeated in a predetermined cycle at a predetermined amplitude.

Further, in the arc-welding method of the present invention, the forward feed and the reverse feed at the wire-feeding speed are not repeated periodically. When a welding state of the short-circuit state is detected, the reverse feed is performed. When a welding state of the arc state is detected, the forward feed is performed.

An arc-welding apparatus of the present invention is an arc-welding apparatus for welding by repeating a short circuit and an arc, and includes a primary rectifier, a switching part, a transformer, a secondary rectifier, a driver, a welding voltage detector, a short-circuit/arc detector, a short-circuit controller, and an arc controller. The primary rectifier rectifies the input electric power, and the switching part converts the output from the primary rectifier into an alternating current. The transformer transforms the output from the switching part. The secondary rectifier rectifies the output from the transformer. The driver controls the switching part, and the welding voltage detector detects a welding voltage. The short-circuit/arc detector has a function of determining whether the welding state is a short-circuit state or an arc state in response to the output from the welding voltage detector, and a function of detecting the sign of changing from the short-circuit state to the arc state in response to the output from the welding voltage detector. The short-circuit controller controls the welding output in the short-circuit state. The arc controller controls the welding output in the arc state. When the sign of opening of the short circuit is detected, the welding current is reduced from a first current value at the detection of the sign to a second current value, which is lower than the first current value. When the opening of the short circuit is detected, a pulse current having a peak value higher than the first current value is supplied at a plurality of times in the arc period.

An arc-welding apparatus of the present invention is an arc-welding apparatus for welding by repeating a short circuit and an arc, and includes a primary rectifier, a switching part, a transformer, a secondary rectifier, a driver, a welding voltage detector, a short-circuit/arc detector, a short-circuit controller, and an arc controller. The primary rectifier rectifies the input electric power, and the switching part converts the output from the primary rectifier into an alternating current. The transformer transforms the output from the switching part. The secondary rectifier rectifies the output from the transformer. The driver controls the switching part, and the welding voltage detector detects a welding voltage. The short-circuit/arc detector determines whether the welding state is a short-circuit state or an arc state in response to the output from the welding voltage detector. The short-circuit controller controls the welding output in the short-circuit state. The arc controller controls the welding output in the arc state. When the change from the short-circuit state to the arc state is detected, a pulse current having a peak value higher than the current value at the opening of the short circuit is supplied at a plurality of times in the arc period.

The arc-welding apparatus of the present invention further includes a wire-feeding speed controller for controlling feeding of a welding wire, and feeds the welding wire at a wire-feeding speed of repeating a forward feed and a reverse feed.

As described above, in the present invention, the molten pool is pushed so that the overlapped parts of surface-treated members are exposed when the members are welded with a welding wire. This allows the gas generated from the members to escape from the exposed root part, thereby suppressing generation of porosities, such as blow holes, and spatters.

DESCRIPTION OF EMBODIMENT

Hereinafter, a description is provided for consumable electrode type arc-welding method and arc-welding apparatus in accordance with an exemplary embodiment of the present invention with reference to the accompanying drawings.

In the exemplary embodiment, a description is provided for an arc-welding method first, and an arc-welding apparatus for performing the arc-welding method next.

Figure 1:
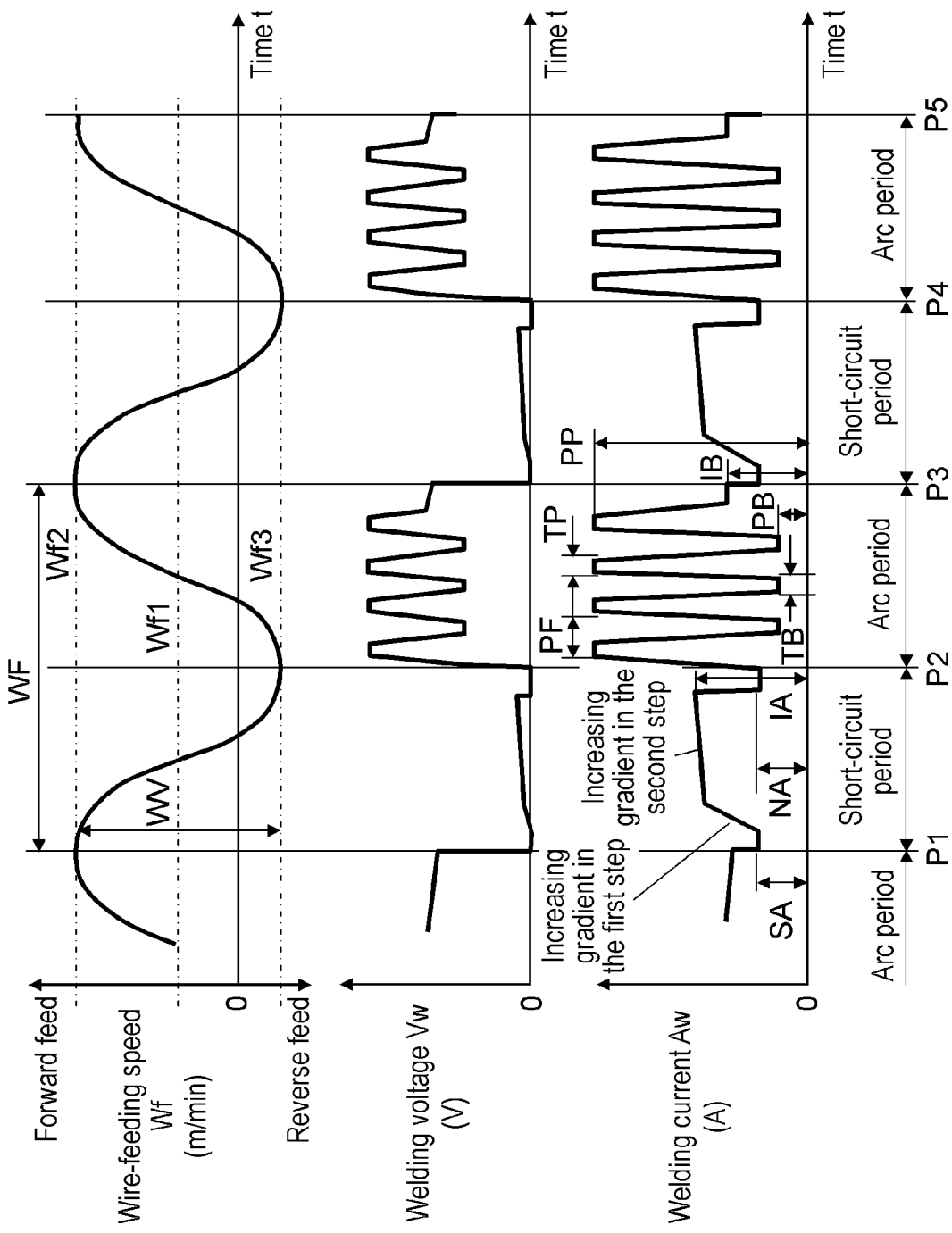
FIG. 1 is a waveform chart showing a wire-feeding speed (in a sine waveform), a welding voltage, and a welding current in accordance with an exemplary embodiment of the present invention.

FIG. 1 is a waveform chart showing a temporal change in a wire-feeding speed, a welding voltage, and a welding current in consumable electrode type arc-welding for alternately repeating a short-circuit state and an arc state.

First, with reference to FIG. 1, a description is provided for wire-feeding control in the exemplary embodiment. In FIG. 1, in reference to predetermined wire-feeding speed Wf1, wire feeding is controlled at a predetermined frequency at a predetermined amplitude. In reference to this basic waveform in the form of a sine wave, wire feeding is controlled so that a forward feed and a reverse feed are periodically repeated. That is, regardless of whether the welding state is a short-circuit state or an arc state, a forward feed and a reverse feed are periodically repeated in reference to the basic waveform in the form of a sine wave. At the peak of the forward feed, a short circuit occurs around time point P1. At the peak of the reverse feed, an arc occurs around time point P2. Around time point P3, i.e. at the peak of the forward feed after time point P2, the next short circuit occurs.

The period from time point P1 to time point P3 is set as one cycle of control, and this cycle is repeated for welding. When wire-feeding speed Wf is in the forward direction, the short circuit is promoted. When the wire-feeding speed Wf is in the reverse direction, opening is promoted. In this manner, occurrence of a short-circuit state and an arc state depends basically on wire-feeding control of periodically repeating a forward feed and a reverse feed at the wire-feeding speed.

Next, a description is provided for welding control in the exemplary embodiment with reference to FIG. 1.

Time point P1 shows the time point at which a short circuit starts, and short-circuit initial current SA is output from time point P1 for a predetermined time period. Thereafter, the short-circuit current is increased with short-circuit current increasing gradient di/dt in the first step (the amount of current increase per unit time). Subsequently, the short-circuit current is increased with short-circuit current increasing gradient di/dt in the second step (the amount of current increase per unit time), which is gentler than increasing gradient di/dt in the first step (the amount of current increase per unit time).

Thereafter, before time point P2, when opening of the short circuit approaches, a constriction 121 of a droplet 120 that is formed between the molten pool formed on the objects to be welded and the tip of the welding wire is detected (see FIG. 5). When the droplet constriction 121, i.e. a sign of opening of the short circuit, is detected, the welding current is instantaneously reduced to constriction current NA (a second current value), which is lower than current IA (a first current value) at the detection of the constriction 121, in order to suppress spatters at the opening of the short circuit.

Time point P2 shows the time point at which separation of the droplet constriction 121 opens the short circuit, the short circuit state ends, and an arc state starts. In the arc period from time point P2, a welding current at peak current PP is output for peak current period TP immediately after the opening of the short circuit, i.e. immediately after occurrence of an arc. Thereafter, the welding current changes from peak current PP to base current PB, and base current PB is output for base current period TB. The change between peak current PP and base current PB is controlled with predetermined current changing gradient di/dt (the amount of current change per unit time), or a rising time and a falling time, so that a predetermined number of pulses are output at a predetermined pulse frequency (pulse cycle PF). Thereafter, in a state where the welding current is controlled at short-circuit standby current IB, the next short circuit is waited for. FIG. 1 shows an example where the number of pulses is four. Peak current PP is larger than current IA at the detection of the constriction 121, and constriction current NA. Base current PB is smaller than current IA at the detection of the constriction 121, and constriction current NA.

Time point P3 shows the time point at which a short circuit occurs next to time point P1. The state is the same as that at time point P1.

Figure 2:
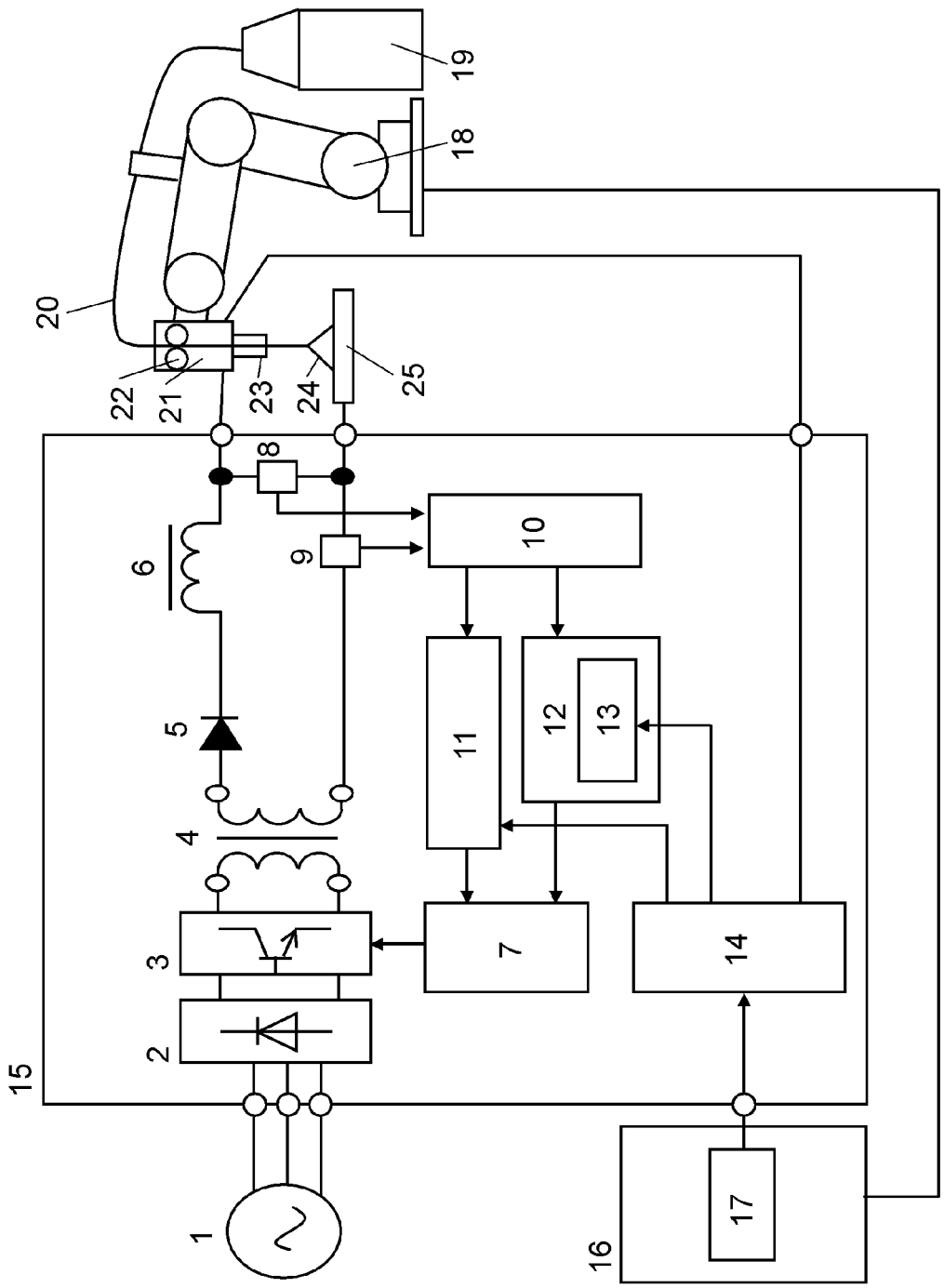
FIG. 2 is a diagram showing a schematic configuration of an arc-welding apparatus in accordance with the exemplary embodiment.

Next, a description is provided for an arc-welding apparatus for controlling arc welding in the exemplary embodiment with reference to FIG. 2. FIG. 2 is a diagram showing a schematic configuration of an arc-welding apparatus in accordance with the exemplary embodiment.

The arc-welding apparatus includes welding power supply 15, manipulator 18, robot controller 16, and torch 21. Robot controller 16 controls manipulator 18. Torch 21 is attached to manipulator 18 and includes feed-roller 22 and welding tip 23.

Referring to FIG. 2, welding power supply 15 includes primary rectifier 2, switching part 3, transformer 4, secondary rectifier 5, DCL 6, driver 7, welding voltage detector 8, welding current detector 9, short-circuit/arc detector 10, short-circuit controller 11, arc controller 12, pulse waveform controller 13, and wire-feeding speed controller 14. Primary rectifier 2 rectifies the electric power input from input power supply 1. Switching part 3 converts the output from primary rectifier 2 into an alternating current. Transformer 4 steps down the output from switching part 3. Secondary rectifier 5 and DCL 6, i.e. an inductance, rectify the output from transformer 4. Driver 7 controls switching part 3. Welding voltage detector 8 is connected between the output terminals of welding power supply 15, and detects a welding voltage. Welding current detector 9 detects the welding output current. In response to a signal output from welding voltage detector 8, short-circuit/arc detector 10 determines a short-circuit state in which welding wire 20 short-circuits with objects to be welded 25 or an arc state in which an arc occurs between welding wire 20 and objects to be welded 25. Upon receipt of a signal indicating a short-circuit state from short-circuit/arc detector 10, short-circuit controller 11 controls the short-circuit current in the short-circuit period. Upon receipt of a signal indicating an arc state from short-circuit/arc detector 10, arc controller 12 controls the arc voltage in the arc period. Pulse waveform controller 13 is disposed in arc controller 12. Wire-feeding speed controller 14 controls the feeding of welding wire 20. Short-circuit/arc detector 10 also has a function of detecting a constriction 121, which is a sign of the change from a short-circuit state to an arc state, in response to the output from welding voltage detector 8.

The output from welding power supply 15 is applied between objects to be welded 25 and welding wire 20 that is drawn from wire storage 19 and passes through welding tip 23. This generates arc 24 between welding wire 20 and objects to be welded 25.

Robot controller 16 includes set current setting part 17 for setting a set current, i.e. an average welding current. The output from set current setting part 17 is input into wire-feeding speed controller 14.

In response to the signal from welding current detector 9, short-circuit/arc detector 10 determines a short-circuit state or an arc state. Short-circuit/arc detector 10 may determine a short-circuit state or an arc state, in response to both of a signal from welding voltage detector 8 and a signal from welding current detector 9.

When a signal indicating a short-circuit period is input from short-circuit/arc detector 10, short-circuit controller 11 controls the welding output in the short-circuit period by controlling driver 7.

When a signal indicating an arc period is input from short-circuit/arc detector 10, arc controller 12 controls the welding output in the arc period by controlling driver 7.

Pulse waveform controller 13 disposed in arc controller 12 determines the pulse waveform suitable for each current set in set current setting part 17.

Pulse waveform controller 13 determines the pulse waveform, pulse frequency, and the number of pulses suitable for each current set in set current setting part 17. Pulse waveform controller 13 includes a table or a relational expression correlating the set current, pulse waveform, pulse frequency, and the number of pulses with each other. Pulse waveform controller 13 determines that a predetermined number of pulse waveforms are output at a predetermined frequency based on the set current.

Here, a description is provided for the reason why outputting a predetermined number of pulse waveforms at a predetermined frequency (cycle) in the arc period is effective for welding galvanized steel sheets.

Figure 3:
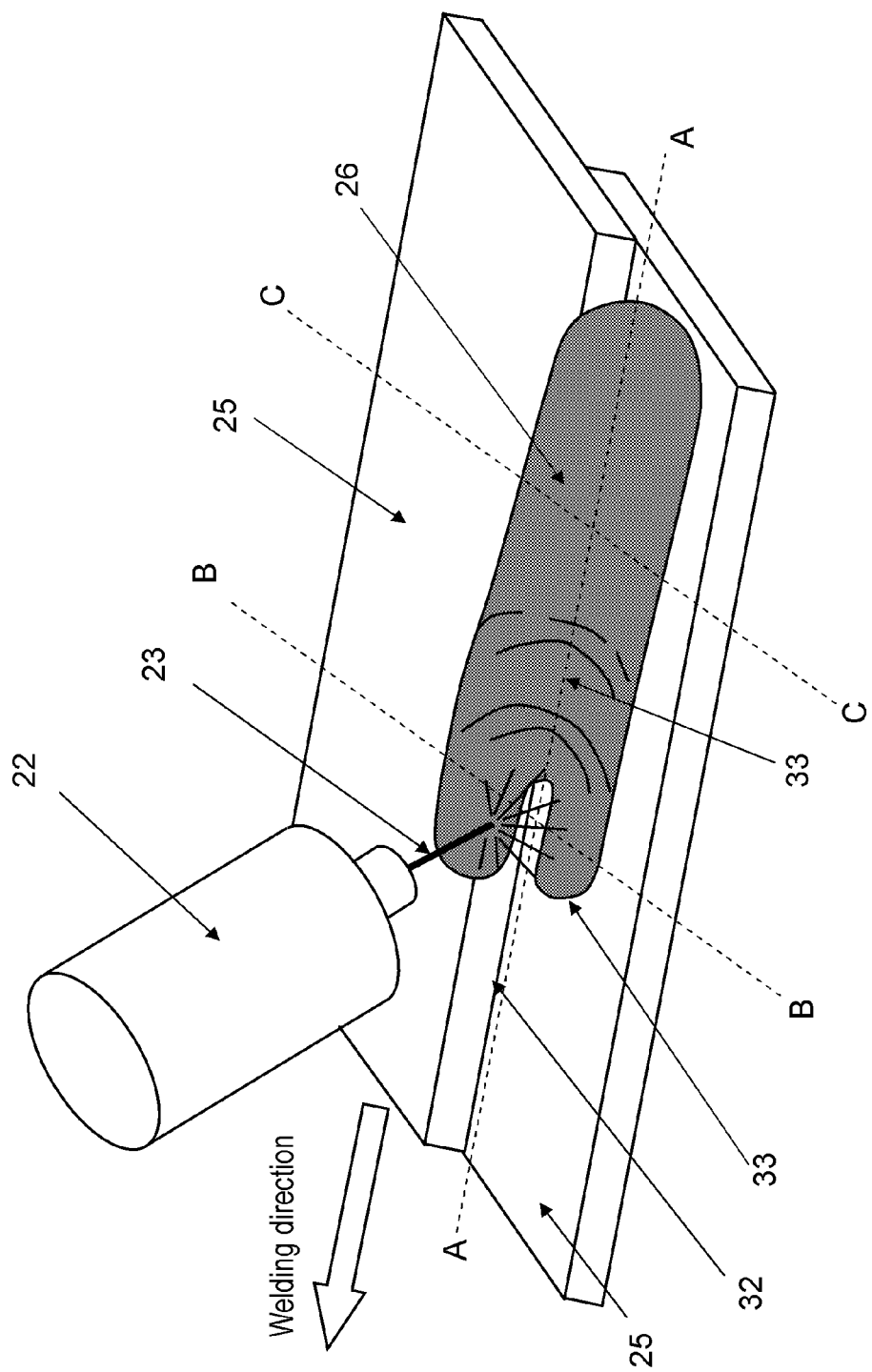
FIG. 3 is a diagram illustrating a state of welding by an arc-welding method in accordance with the exemplary embodiment.
Figure 4:
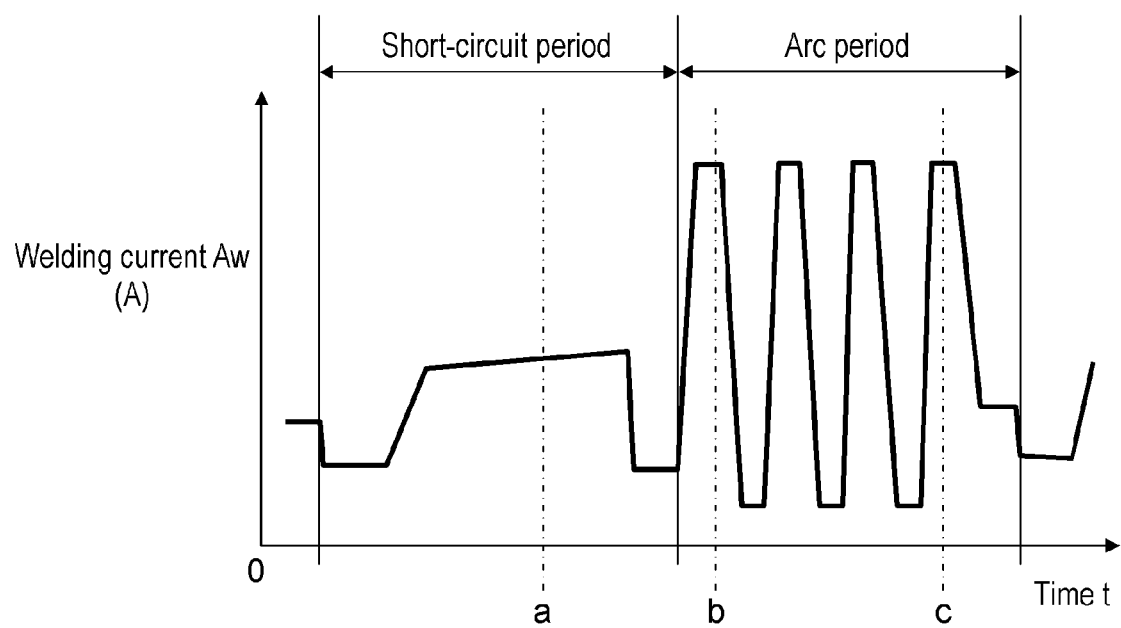
FIG. 4 is a diagram showing a welding current waveform in accordance with the exemplary embodiment.
Figure 5A:
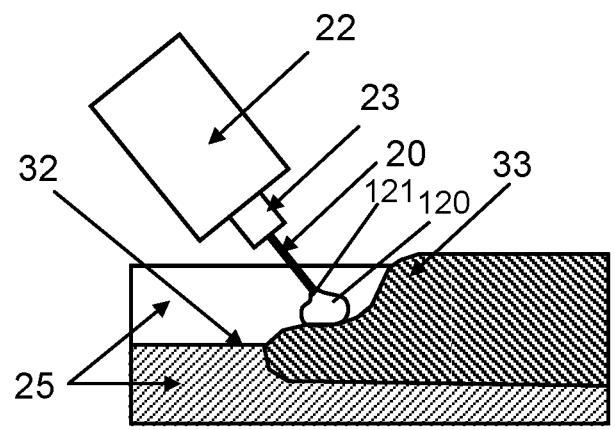
FIG. 5A is a sectional view of a short-circuit state in accordance with the exemplary embodiment.
Figure 5B:
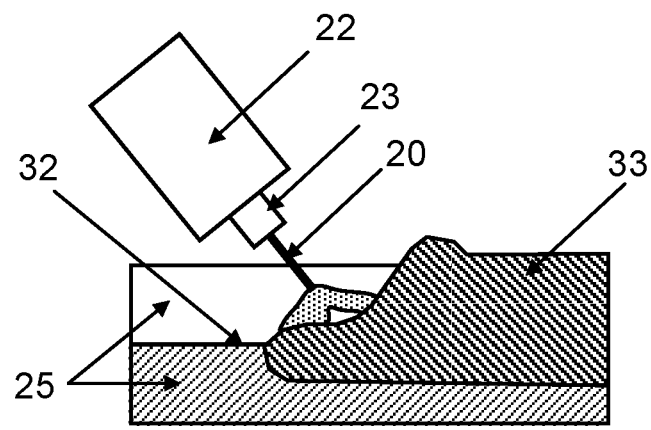
FIG. 5B is a sectional view in a state where a first pulse after opening of a short circuit is given in accordance with the exemplary embodiment.
Figure 5C:
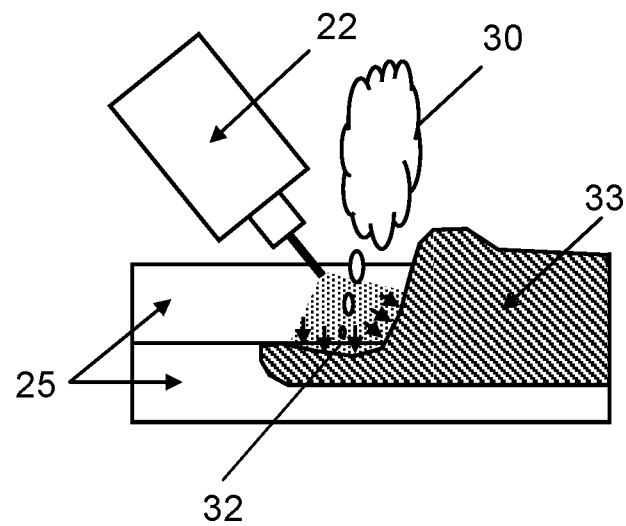
FIG. 5C is a sectional view in a state where a fourth pulse after the opening of the short circuit is given in accordance with the exemplary embodiment.
Figure 6:
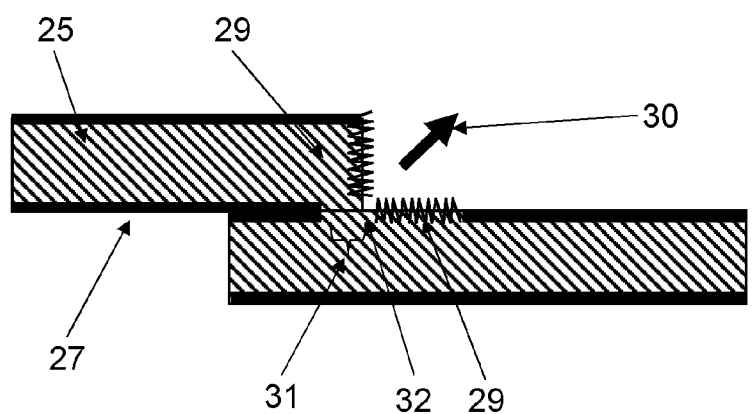
FIG. 6 is a diagram showing a section of a welding part in accordance with the exemplary embodiment.
Figure 7:
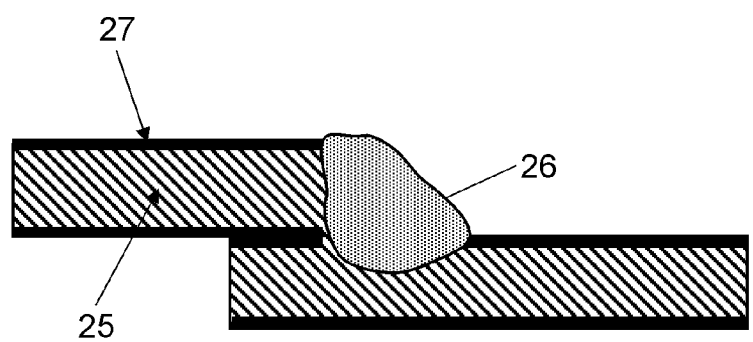
FIG. 7 is a diagram showing a section of a welding part in accordance with the exemplary embodiment.

FIG. 3 is a diagram illustrating a welding state in accordance with the exemplary embodiment. FIG. 4 is a diagram showing a waveform of a welding current in accordance with the exemplary embodiment. FIG. 5A is a sectional view of a short-circuit state in accordance with the exemplary embodiment. FIG. 5B is a sectional view in a state where a first pulse after opening of a short circuit is given in accordance with the exemplary embodiment. FIG. 5C is a sectional view in a state where a fourth pulse is given in accordance with the exemplary embodiment. FIG. 6 is a diagram showing a section of a welding part in accordance with the exemplary embodiment. FIG. 7 is a diagram showing a section of a welding part in accordance with the exemplary embodiment. FIG. 6 is a section taken on line B-B in the welding state shown in FIG. 3; FIG. 7 is a section taken on line C-C in the welding state shown in FIG. 3.

FIG. 5A-FIG. 5C show sections taken on line A-A in the welding state shown in FIG. 3 and correspond to time points a-c in the welding current waveform shown in FIG. 4. Specifically, FIG. 5A is a sectional view at time point a shown in FIG. 4, that is, a sectional view in a short-circuit state. FIG. 5B is a sectional view at time point b shown in FIG. 4, that is, a sectional view when a first pulse current is given in the arc period after the opening of the short circuit. FIG. 5C is a sectional view at time point c shown in FIG. 4, that is, a sectional view when a fourth pulse current is given in the arc period after the opening of the short circuit.

In the short-circuit state shown in FIG. 5A, root part 32 of objects to be welded 25 are covered with molten metal 33 of the molten pool. However, in the state where a first pulse current after the opening of the short circuit is given as shown in FIG. 5B, molten metal 33 of the molten pool covering root part 32 of objects to be welded 25 starts to be pushed. The state of FIG. 5C where a fourth pulse current after the opening of the short circuit is given shows that molten metal 33 of the molten pool covering root part 32 of objects to be welded 25 can be pushed out completely.

The above description is summarized as the following mechanism. Supplying a pulse current at a plurality of times in the arc period pushes out molten metal 33 of the molten pool covering root part 32 of objects to be welded 25 directly under arc 24, and thereby expose root part 32. Thus, as shown in FIG. 6, zinc vapor 30 is easily released to the outside from vaporized galvanization part 31 where the top plate and the bottom plate of objects to be welded 25 are overlapped.

In order to implement such a mechanism, in the case of $CO_2$ welding with a gas having high concentration of arc, it is not necessary to output a plurality of pulse currents as described above, and only one pulse current is sufficient. One pulse current is capable of pushing out molten metal 33 of the molten pool in root part 32 of objects to be welded 25.

However, in the case of MAG welding with a gas having low concentration of arc, a high current is supplied at a large number of times. That is, it is necessary to give a pulse current at a plurality of times so as to push out molten metal 33 of the molten pool in root part 32 of objects to be welded 25 and thereby expose root part 32. Giving a pulse current at a plurality of times can prevent the separation of the droplet 120 and suppress micro short circuits.

The suitable number of pulse currents varies with the coating weight of galvanization 27. As the coating weight increases, the exposure time of root part 32 of objects to be welded 25 needs to be increased so that zinc vapor 30 is released easily. For this purpose, it is preferable to increase the number of pulse currents in the suitable period. However, an excessive number of pulse currents reduce the number of short circuits. Thus, preferably, the upper limit is seven pulse currents with which approximately 30 short circuits occur.

Further, setting the attitude of torch 21 at a sweepback angle can enhance the effect of releasing zinc vapor 30.

When root part 32 is completely exposed by the arc force of arc 24 as shown in FIG. 5C and FIG. 6, zinc vapor 30 is easily released without spatters unlike the conventional art. Referring to FIG. 6, even if molten portions 29 and part of molten metal 33 of the molten pool on root part 32 of objects to be welded 25 cover the exposed part, covering molten metal 33 as thin as approximately 0.5 mm or less does not hinder the release of zinc vapor 30. With this state, root part 32 of objects to be welded 25 is easily exposed by the release of zinc caused by volume expansion thereof, and zinc vapor 30 is easily released to the outside. That is, molten metal 33 of the molten pool may be pushed by the arc force of arc 24 so as to have the following thickness. With this thickness, volume-expanded zinc vapor 30 generated from the top plate and the bottom plate of objects to be welded 25 can break molten portions 29 and molten metal 33 of the molten pool covering root part 32 of objects to be welded 25 and pass therethrough.

Figure 8:
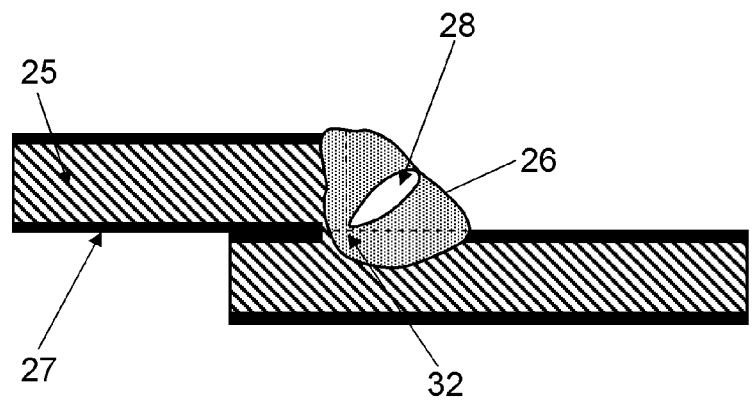
FIG. 8 is a diagram showing a section of a welding part when galvanized steel sheets are welded by a conventional arc-welding method.

As described above, regularly releasing zinc vapor 30 generated during welding can considerably suppress generation of spatters. In the conventional art, zinc vapor 30 builds up in molten metal 33 and generates porosities 28 (blow holes and pits) as shown in FIG. 8. In the conventional art, when zinc vapor 30 is vigorously released from molten metal 33, the vapor short-circuits with the tip of welding wire 20, which increases generation of spatters. However, in accordance with the exemplary embodiment, as shown in FIG. 7, porosities 28 (blow holes and pits) can be suppressed.

In order to regularly stabilize the mechanism of the exemplary embodiment, it is preferable to control wire-feeding of repeating a forward feed and a reverse feed. This is because the above mechanism can be effectively implemented by regularly making the short-circuit state and the arc state, and instantaneously ensuring the arc length immediately after the opening of the short circuit. Root part 32 can be exposed by pushing molten metal 33 of the molten pool in the state where the arc length immediately after the opening of the short circuit is short (approximately 1 mm to 2 mm). In simple pulse welding, even a short arc length ranges from approximately 4 mm to 5 mm. Such a long arc length cannot exert the arc force sufficient to push molten metal 33 of the molten pool.

Next, a description is provided for suitable parameters of pulse waveforms. Root part 32 of objects to be welded 25 can be exposed by setting peak current PP and base current PB of the pulse waveform and the pulse frequency (pulse cycle PF) of FIG. 1 to the following parameters.

As the arc force sufficient to push molten metal 33 of the molten pool, it is preferable to set peak current PP to 400 A to 600 A. In order to slightly vary the arc force, it is preferable to set base current PB to 100 A to 250 A. Preferably, each of peak current period TP and base current period TB, i.e. the time period during which molten metal 33 of the molten pool is pushed, is set to 100 µs to 500 µs. Based on the above parameters, the suitable pulse frequency ranges from 300 Hz to 1500 Hz, that is, suitable pulse cycle PF ranges from approximately 3333 µs to 666 µs. It is not necessary that peak current period TP and base current period TB have the same period of time. Gradient di/dt rising from base current PB to peak current PP and gradient di/dt falling from peak current PP to base current PB are determined based on the above parameters.

When a plurality of such pulse waveforms are output, a droplet only grows at the tip of welding wire 20 and does not separate therefrom. Thus, even if a large droplet is formed with a small number of short circuits, irregular short circuits are unlikely to occur in the arc period. Therefore, a number of short circuits suitable for welding the galvanized steel sheets can suppress generation of spatters.

Also in the arc start period where the molten pool is unlikely to be formed, the control of the exemplary embodiment can suppress generation of porosities 28. For $CO_2$ welding, outputting a plurality of pulses is unnecessary in the steady welding period. However, outputting a plurality of pulses is effective in the arc start period not only for MAG welding but also for $CO_2$ welding.

The exemplary embodiment shows an example where peak current PP and base current PB of the pulse waveform, a pulse frequency (pulse cycle PF), and the number of pulse waveforms are determined based on the set current. However, it is widely known that the set current is proportional to the wire-feeding speed and wire-feeding amount. Thus, the similar advantage can be obtained by determining the parameters related to pulse waveforms based on the wire-feeding speed and the wire-feeding amount instead of the set current.

Figure 9:
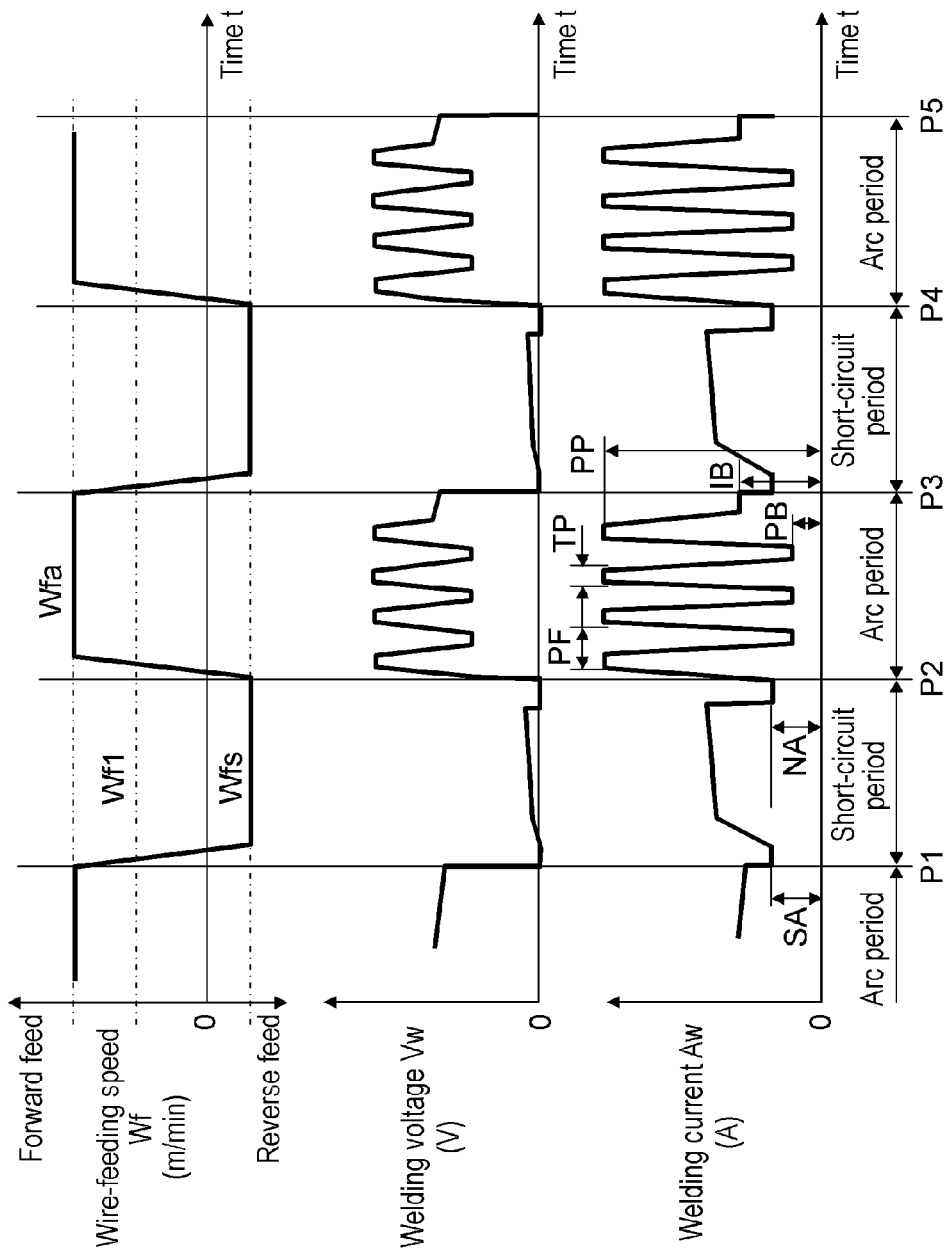
FIG. 9 is a waveform chart showing a wire-feeding speed (in a trapezoidal waveform), a welding voltage, and a welding current in accordance with the exemplary embodiment.

The above description shows an example where a change in the wire-feeding speed is in a sine waveform as shown in FIG. 1. However, as shown in FIG. 9, the similar advantage can be obtained when a change in the wire-feeding speed is in a trapezoidal waveform.

Figure 10:
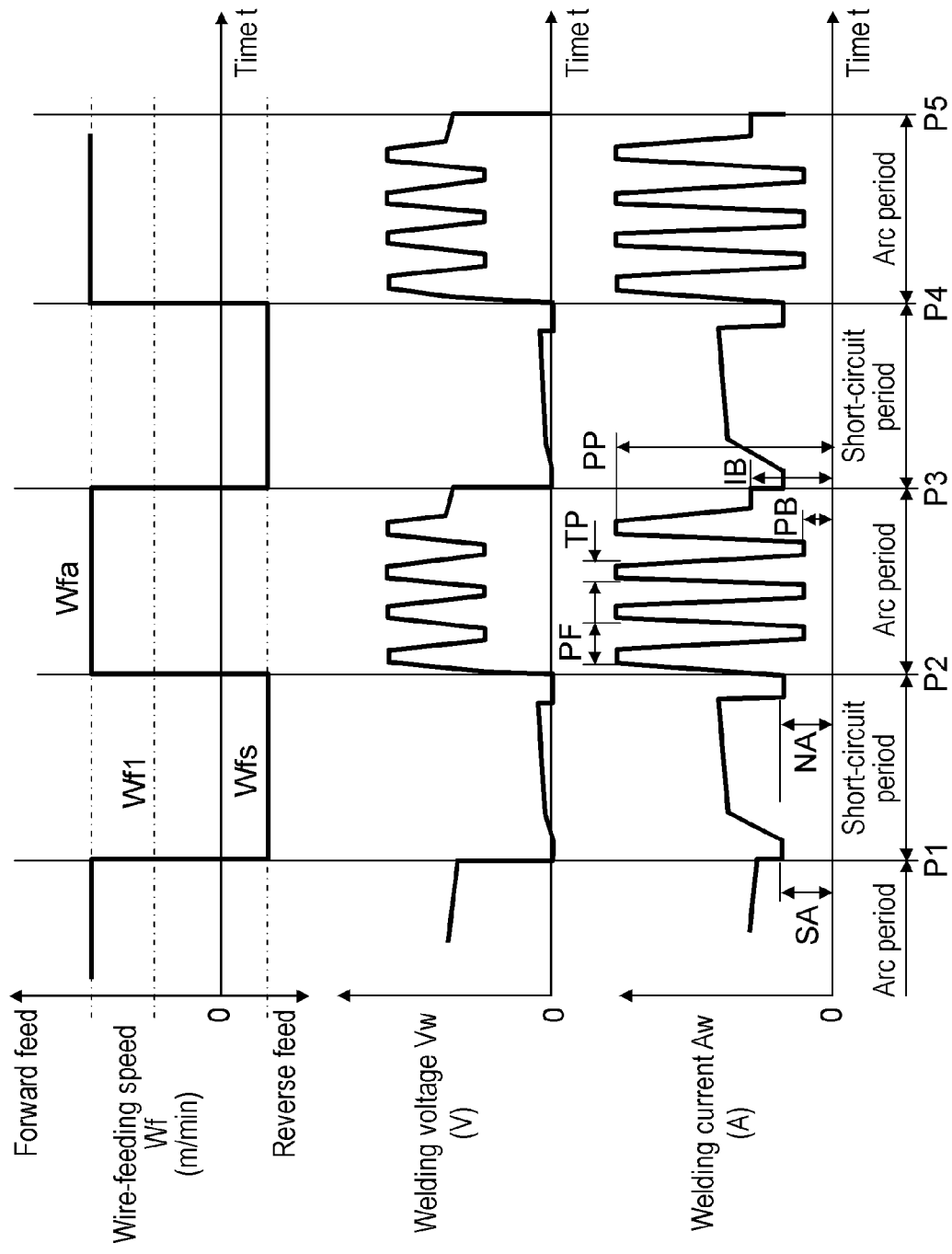
FIG. 10 is a waveform chart showing a wire-feeding speed, a welding voltage, and a welding current in accordance with the exemplary embodiment.
Figure 11A:
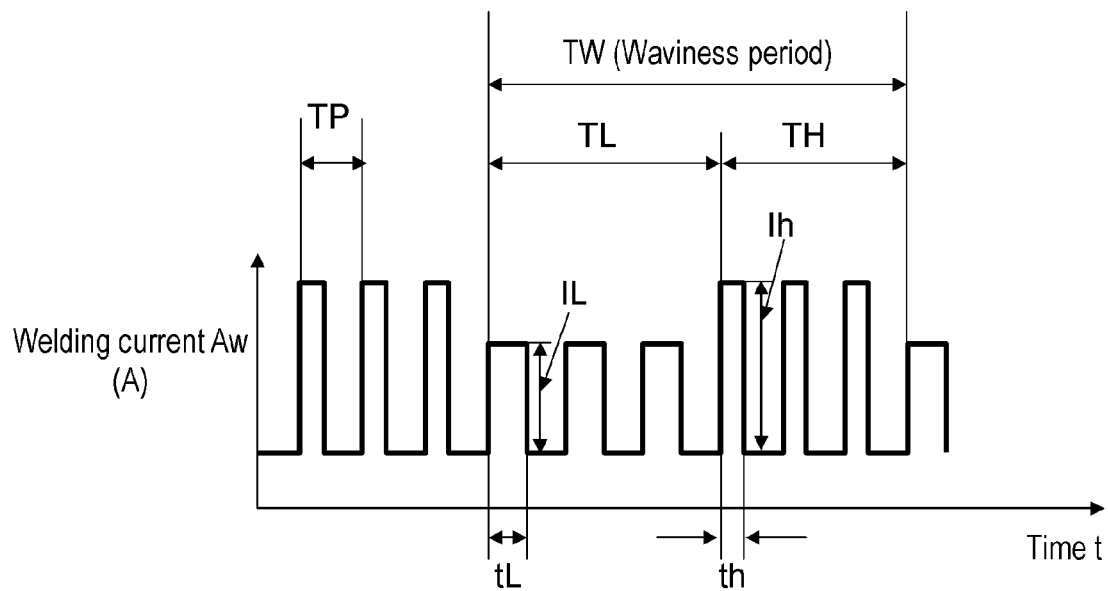
FIG. 11A is a chart showing a waveform of a welding current in a conventional arc-welding method.
Figure 11B:
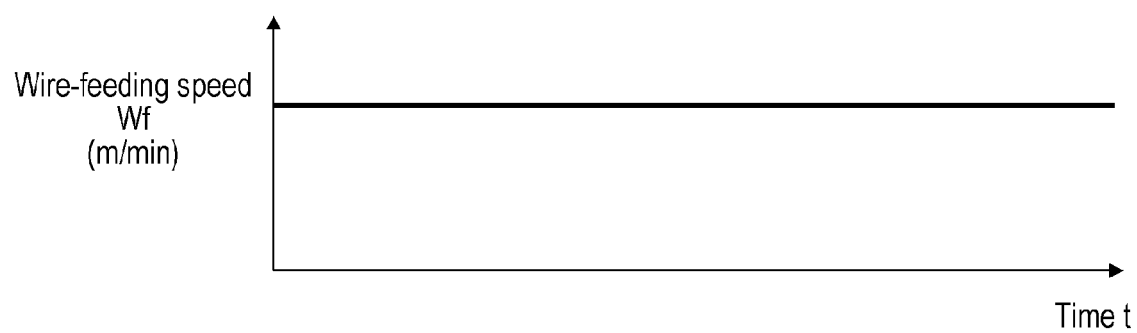
FIG. 11B is a chart showing a waveform of a wire-feeding speed in a conventional arc-welding method.

As shown in FIG. 10, the similar advantage can be obtained by the feeding control where a reverse feed is made when the welding state is a short-circuit state and a forward feed is made when the welding state is an arc state. As a result, in FIG. 10, the feeding control is periodical, but it is not necessary to be periodical.

FIG. 1 shows the following example. Before time point P2, when opening of the short circuit approaches, a constriction 121 of a droplet 120 that is formed between the molten pool formed on objects to be welded 25 and the tip of welding wire 20 is detected. Then, the welding current is instantaneously changed to constriction current NA, which is lower than current IA at the detection of the constriction 121. Next, a plurality of pulse currents are supplied. Though not shown, opening of the short circuit may be detected instead of detection of a constriction 121 and the reduction of current upon the constriction detection as shown in FIG. 1. In this case, when opening of the short circuit is detected, a pulse current having a peak value higher than the current value at the opening of the short circuit is supplied at a plurality of times. This can advantageously reduce the spatters and blow holes caused by galvanization. Also in this case, it is preferable that the lower limit of the pulse current supplied at a plurality of times in the arc period is set lower than the current value at the opening of the short circuit. This is because a large difference between the upper limit and the lower limit of the pulse current can relatively vary the arc force and enhance the effect of pushing molten metal 33 of the molten pool. The smaller lower limit of the pulse current can reduce the energy exerted on welding wire 20, thereby suppressing the separation of the droplet 120.

In accordance with the present invention, when surface-treated members, such as galvanized steel sheets, are welded with a welding wire, gas generated from the members is released from the exposed part by pushing the molten pool so as to expose the overlapped parts of the members. This can considerably suppress generation of porosities, such as blow holes, and generation of spatters. Thus, the present invention is industrially useful as an arc-welding method and an arc-welding apparatus used to weld surface-treated members, such as galvanized steel sheets, which generates gas during welding.

What is claimed is:

1. An arc-welding method, comprising:
   providing a welding wire and an object; and
   welding the object by causing a welding current to flow in the welding wire as to repeat a short-circuit period in which a short circuit occurs between the object and the welding wire and an arc period in which an arc occurs between the object and the welding wire,
   wherein said welding the object comprises:
      when an opening of the short circuit is detected, changing the short-circuit period to the arc period; and
      controlling the welding current such that the welding current repeats a pulse current having a peak value at a plurality of times in an arc period, the peak value being higher than a current value of the welding current at the opening of the short circuit, and
   wherein a lower limit of the pulse current in the arc period is lower than the current value.

2. The arc-welding method of claim 1, further comprising feeding the welding wire at a wire-feeding speed repeating a forward feed and a reverse feed while executing said welding the object.

3. The arc-welding method of claim 2, wherein the wire-feeding speed repeats the forward feed and the reverse feed periodically in a predetermined cycle at a predetermined amplitude.

4. The arc-welding method of claim 2, wherein said feeding the welding wire comprises:
   when the short-circuit is detected, feeding the welding wire at a wire-feeding speed of the reverse feed; and
   when the arc is detected, feeding the welding wire at a wire-feeding speed of the forward feed.

5. An arc-welding method, comprising:
   providing a welding wire and an object; and
   welding the object by causing a welding current to flow in the welding wire as to repeat a short-circuit period in which a short circuit occurs between the object and the welding wire and an arc period in which an arc occurs between the object and the welding wire,
   wherein said welding the object comprises:
      in the short-circuit period, causing the short circuit to occur between the object and the welding wire via a droplet by forming the droplet by melting the welding wire with the welding current;
      when a constriction between the droplet and the welding wire is detected, reducing the welding current from a first current value at the detection of the constriction to a second current value while the short circuit occurs, the second current value being lower than the first current value; and
      when an opening of the short circuit is detected after said reducing the welding current, controlling the welding current in the arc period such that the welding current increases from the second current value to a peak value higher than the first current value and then repeating a pulse current having the peak value a plurality of times, wherein a lower limit of the pulse current in the arc period is lower than the second current value.

6. The arc-welding method of claim 5, further comprising feeding the welding wire at a wire-feeding speed repeating a forward feed and a reverse feed while executing said welding the object.

7. The arc-welding method of claim 6, wherein the wire-feeding speed repeats the forward feed and the reverse feed periodically in a predetermined cycle at a predetermined amplitude.

8. The arc-welding method of claim 6, wherein said feeding the welding wire comprises:

when the short-circuit is detected, feeding the welding wire at a wire-feeding speed of the reverse feed; and when the arc is detected, feeding the welding wire at a wire-feeding speed of the forward feed.

* * * * *